United States Patent Office 3,489,776
Patented Jan. 13, 1970

3,489,776
2-(OR 3)-BROMO(AND 2,3-DIBROMO)-1,4,5-TRI-AMINO-8-HYDROXY-ANTHRAQUINONES
Karl-Heinz Peters, Cologne, Buchheim, and Rutger Neeff, Leverkusen, Germany, assignors to Farbenfabriken Bayer Aktiengesellschaft, Leverkusen, Germany, a corporation of Germany
No Drawing. Filed Jan. 3, 1967, Ser. No. 606,559
Claims priority, application Germany, Jan. 13, 1966, F 48,160
Int. Cl. C09b 1/50
U.S. Cl. 260—380    4 Claims

ABSTRACT OF THE DISCLOSURE

Brominated 1,4,5-triamino-8-hydroxy anthraquinones are produced by reacting a cyclic sulphamide ester or a cyclic sulphimide ester of 1,4-diamino-5-nitro - bromoanthraquinone with sulphur in oleum.

This invention comprises new and valuable 1,4,5-triamino-8-hydroxy-anthraquinones, the production of the same and their use in dyeing and printing. The products are of the formula

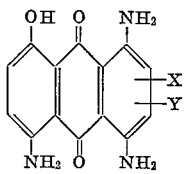

in which X stands for halogen and Y for hydrogen or halogen.

Said products are obtained according to the invention by reacting cyclic sulphamide esters of the formula

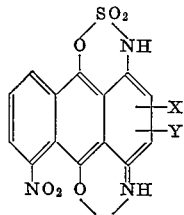

or cyclic sulphimide esters of the formula

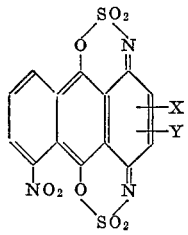

with sulphur in oleum, X and Y having the aforesaid meanings. The halogen substituents are preferably bromine or chlorine substituents.

Examples of sulphamide esters used as starting material for the process according to the invention are the followings: cyclic 2-bromo-, 3-bromo-, 2-chloro-, 3-chloro-, 2(or 3)-bromo-, 2(or 3)-chloro-5-nitro-anthraquinone-,4-disulphonamide, cyclic 2,3-dibromo- or 2,3-dichloro-5-nitro-anthraquione-1,4-disulphonamide.

Examples of cyclic sulphimide esters are the following: cyclic 2-bromo-, 3-bromo-, 2 (or 3)-bromo-, 2-chloro-, 3-chloro-, 2 (or 3)-chloro-5-nitro-anthraquinone-1,4-disulphonimide, cyclic-2,3-dibromo- or 2,3-dichloro-5-nitro-anthraquinone-1,4-disulphonimide.

The process according to the invention can be carried out, for example, by treating the cyclic sulphamide esters or the cyclic sulphimide esters at 0–150° C., preferably at 20–120° C., with a solution of sulphur in 5–65% oleum, subsequently separating the excess sulphur by careful dilution with water and isolating the reaction product in known manner, for example, by pasting the solution with ice-water. The sulphur is preferably used in amounts of ½ sulphur atom or more per anthraquinone molecule.

If the reaction is carried out with the use of cyclic sulphimide esters, these can also be produced in the reaction mixture in situ from appropriately halogenated 1,4-diamino-5-nitro-anthraquinones.

The dyestuffs which can be obtained by the present process, or mixtures thereof, can be used for dyeing natural fibres and synthetic materials, preferably polyamides, polyurethanes, polyacrylonitriles, polypropylene and polyesters, the polyesters comprising, in particular, linear aromatic polyesters, such as polyethylene terephthalate or polyesters obtained from terephthalic acid and 1,4-bis-hydroxymethylcyclohexane, as well as cellulose esters such as cellulose triacetate or cellulose 2½-acetate. It is advantageous to bring the dyestuffs into a fine dispersion by the usual methods, for example, by reprecipitation, grinding or kneading in the presence of dispersing agents, and to apply them by known dyeing methods. While cellulose 2½-acetate is dyed, for example, in the presence of Marseilles soap at 60–80° C., cellulose triacetate and polyamide fibres can be dyed at 100° C. When dyeing polyethylene terephthalate fibres, the usual dyeing accelerators can be added or the dyeing can be carried out at 120–145° C. under pressure. The dyestuffs are also eminently suitable for the dyeing and printing of polyester or polyamide fibres by the thermosol process in which the padded or printed fibre materials are briefly heated, optionally after an intermediate drying, to temperatures ranging from 180–220° C. This heating is generally carried out for periods of time ranging from 30 seconds to 2 minutes.

The dyeings and prints obtained with the dyestuffs according to the invention are characterised by a high dyestuff yield and very good texture and also by clear shades which have excellent fastness to light, washing, thermofixing and sublimation.

Admittedly, it is known from French patent specification No. 1,360,646 that the reduction of cyclic 5-nitroanthraquione-1,4-disulphonimide with sulphur in oleum yields a mixture of 1,4,5-triamino-2,8 and -3,8-dihydroxy-anthraquione which is suitable for the dyeing of polyester fibres. In the process of the said patent specification, however, a hydroxyl group is introduced into the β-position of the anthraquinone molecule. This is not the case in the process according to the invention. The dyeings and prints obtained with the dyestuffs of the process according to the invention are moreover characterised by higher fastness to thermofixing, sublimation and light.

In the following examples the parts are parts by weight, unless otherwise stated.

EXAMPLE 1

(a) A mixture of 68 parts of 65% oleum and 43 parts sulphuric acid monohydrate is treated at 15–20° C. with 5 parts of sulphur flowers, the mixture is stirred at 15–20° C. for 30 minutes and then diluted with 167 parts sulphuric acid monohydrate. 39 parts of cyclic 2,3-dibromo-5-nitro-anthraquinone - 1,4 - disoulphonimide are then introduced at 15–20° C., the mixture is stirred at 25–28° C. for two hours, heated to 60° C. within two hours and then to 90° C. within one hour. The reaction mixture is then treated with 67 parts of 85% sulphuric acid, heated to 115° C. and, after 10 minutes at 115–120°

C., allowed to cool. It is subsequently diluted with 100 parts of water, filtered off with suction from the precipitated sulphur and then slowly diluted with 150 parts of water. The reaction product which crystallises in the form of orange-red small needles is filtered off with suction and after boiling with water, suction-filtration, washing with water and drying, there are obtained 25.2 parts 2,3-dibromo-1,4,5-triamino - 8 - hydroxy - anthraquinone (86% of theory) in the form of small blue needles.

The same final product is obtained by using, instead of 2,3-dibromo-5-nitro-anthraquinone - 1,4 - disulphonimide, equivalent amounts of the corresponding 1,4-disulphonamide.

$C_{14}H_9Br_2N_3O_3$ (427.0): Calc.: Br, 37.43; N, 9.85; O, 11.23. Found: Br, 36.8; N, 9.78; O, 11.47.

The cyclic 2,3-dibromo-5 - nitro - anthraquinone - 1,4-disulphonimide used as starting material can be prepared, for example, as follows:

100 parts of cyclic 5-nitro - anthraquinone - 1,4 - disulphonimide in a mixture of 735 parts of 96% sulphuric acid and 192 parts of 20% oleum are treated at 0–5° C. with 79.7 parts of bromine, the reaction mixture is stirred at 0–5° C. for 4 hours and kept at 5–20° C. for a further 8 hours. 500 parts of water are then added dropwise at 0–5° C. The product which crystallises in the form of red prisms is filtered off with suction, washed with 65% sulphuric acid and then with ice-water and, after drying, there are obtained 133 parts of cyclic 2,3-dibromo - 5 - nitro - anthraquinone - 1,4 - disulphonimide (96.5% of theory).

When the reaction is carried out with 39.9 parts bromine at 0–5° C., 130 parts of cyclic 2,3-dibromo-5-nitro-anthraquinone-1,4 - disulphonamide (95.4% of theory) are obtained in the form of well formed yellow square prisms.

(b) A fabric of polyethylene terephthalate fibres is impregnated on a foulard with a liquor containing, per litre, 20 g. 2,3-dibromo-1,4,5-triamino - 8 - hydroxy-anthraquinone and 10 g. of a thermosol auxiliary, especially a polyether such as is described, for example, in Belgian patent specification No. 615,102. The fabric is then squeezed to a weight increase of 70% and dried in a suspended nozzle drier or drying cabinet at 80–120° C. The fabric is subsequently treated in a stenter or nozzle hot flue with hot air at 190–210° C. for about 45 seconds, then rinsed, reductively after-treated, if desired, washed, rinsed and dried. The reductive after-treatment to remove any dyestuff particles superficially adhering to the fibres can be carried out by introducing the fabric at 25° C. into a bath containing 3–5 cc./litre of a sodium hydroxide solution of 38° Bé. and 1–2 g./litre of concentrated hydrosulphite, heating the bath to 70° C. within 15 minutes and keeping it at 70° C. for a further 10 minutes. The material is then rinsed hot, acidified with 2–3 cc./litre of 85% formic acid at 50° C., rinsed and dried. A clear blue dyeing is obtained, which is characterised by its high dyestuff yield and very good texture as well as by excellent fastness to light, thermofixing, washing, rubbing and sublimation. In a similar manner a clear blue dyeing is obtained by using, instead of the polyethylene terephthalate fibres, polyester fibres made from 1,4-bis-hydroxymethyl-cyclohexane and terephthalic acid, or fibres of cellulose triacetate or polyamide.

(c) A previously cleaned and thermofixed fabric made of polyethylene terephthalate fibres is printed with a printing paste consisting of the following components: 40 g. 2,3-dibromo-1,4,5-triamino - 8 - hydroxy - anthraquinone, 475 g. of water, 465 g. of crystal gum 1:2, and 20 g. of sulphonated castor oil. An alginate thickener may also be used, instead of crystal gum. The printed and dried material is passed at 190–210° C. over a high capacity stenter or through a condensation apparatus in order to fix the dyestuff. The treatment lasts for about 30–60 seconds. The fixed print so obtained is subsequently rinsed cold, soaped with 1–2 g./litre of an anion-active detergent at 70–80° C. for about 10 minutes, rinsed first hot and then cold, and dried. A print is obtained which corresponds to the dyeing of Example 1(b) and is characterised by the same fastness properties. In a similar manner a clear blue print is obtained by using, instead of the polyethylene terephthalate fibres, polyester fibres made from 1,4-bis-hydroxymethyl-cyclohexane and terephthalic acid or fibres of cellulose triacetate or polyamide.

(d) 10 parts of polyethylene terephthalate fibres are dyed at 125–135° C. for 2 hours in a bath adjusted to pH 4.5 and consisting of 400 parts of water and 0.1 part of the finely dispersed dyestuff mentioned in Example 1(a), subsequently rinsed and dried. A clear blue dyeing is obtained which is characterised by very good fastness properties.

(e) 10 parts of polyethylene terephthalate fibres are dyed at 100° C. for 90 minutes in a bath adjusted to pH 4.5 and consisting of 400 parts of water, 0.1 part of the finely dispersed dyestuff mentioned in Example 1(a) and 1.5 parts o-cresotic acid methyl ester. A clear blue dyeing is obtained which is characterised by very good fastness properties.

(f) 10 parts polyamide fibres are dyed at the boil for 1 hour in a bath consisting of 400 parts of water, 0.2 part of a conventional dispersing agent and 0.2 part of the finely dispersed dyestuff mentioned in Example 1(a). A clear blue dyeing of very good fastness properties is obtained.

(g) 20 parts of cellulose 2½-acetate fibres are dyed at 70° C. for one hour in a bath consisting of 600 parts of water, 1 part Marseilles soap and 0.2 part of the dyestuff mentioned in Example 1(a). A clear blue dyeing of very good fastness to light and washing is obtained.

(h) 10 parts of cellulose triacetate fibres are dyed at 100° C. for 90 minutes in a bath adjusted to pH 4–5 and consisting of 400 parts of water, 0.1 part of the finely dispersed dyestuff mentioned in Example 1(a) and 2 parts o-cresotic acid methyl ester. A clear reddish blue dyeing is obtained which is characterised by very good fastness properties.

EXAMPLE 2

A mixture of 68 parts of 65% oleum and 43 parts sulphuric acid monohydrate is treated at 15–20° C. with 5 parts of sulphur flowers, stirred at 15–20° C. for 30 minutes and then diluted with 167 parts sulphuric acid monohydrate. 31.7 parts of cyclic 2,3-dichloro-5-nitro-anthraquinone-1,4-disulphonamide are then introduced at 15–20° C., the reaction mixture is stirred for two hours at 25–28° C., heated to 60° C. within 2 hours and then to 90° C. within one hour. After the addition of 67 parts of 85% sulphuric acid, the mixture is heated to 115° C. and, sulphuric acid, the mixture is heated to 115° C. and, after 5 minutes at 115° C., allowed to cool. It is subsequently diluted with 100 parts of water, filtered off with suction from the precipitated sulphur and the reaction product is obtained in the form of orange-red prisms by slowly diluting with 150 parts of water. The product is filtered off with suction and after boiling with water, filtering off with suction, washing with water and drying, 17.0 g. 2,3-dichloro-1,4,5-triamino-8-hydroxy-anthaquinone are obtained in the form of dark blue prisms (76.5% of theory).

$C_{14}H_9Cl_2N_3O_3$ (338.0): Calc.: Cl, 20.95; N, 12.43; O, 14.20. Found: Cl, 20.35; N, 12.31; O, 14.55.

By dyeing or printing polyethylene terephthalate fibres according to the processes of Example 1(b), 1(c) or 1(e), there are obtained clear blue shades which are characterised by a high dyestuff yield and very good texture, as well as by outstanding fastness to light, thermofixing, sublimation, rubbing and washing. By dyeing polyamide fibres according to the process of Example 1(f), blue shades of good fastness to water, washing and light are obtained.

By dyeing cellulose 2½-acetate fibres according to the process of Example 1(g), clear blue shade of excellent fastness to light and wet processing are obtained. By dyeing cellulose triacetate fibres according to the process of Example 1(h), clear blue shades of outstanding fastness to light, washing and sublimation are obtained. The cyclic 2,3-dichloro-5-nitro-anthraquinone - 1,4 - disulphonamide used as starting material can be prepared, for example, by adding chlorine on to cyclic 5-nitro-anthraquinone-1,4-disulphonimide in 2% oleum at 0–60° C.

EXAMPLE 3

31.6 parts of cyclic-2,3-dichloro-5-nitro-anthraquinone-1,4-disulphonimide are reacted according to the process of Example 2, and 16.8 g. 2,3-dichloro-1,4,5-triamino-8-hydroxyanthraquinone (75.5% of theory) are obtained in the form of dark blue prisms. The dyestuff is identical with the dyestuff of Example 2, and when applied to fibres of polyethylene terephthalate, polyamide, cellulose 2½-acetate and cellulose triacetate according to the processes of Example 1(b) to (h), yields dyeings which are identical with the dyeings of Example 2 in respect of shade and fastness properties.

The cyclic 2,3-dichloro-5-nitro-anthraquinone-1,4-disulphonimide used as starting material can be obtained, for example, by reacting 245 parts 2,3-dichloro-1,4-diaminoanthraquinone in 1880 parts of 65% oleum with stirring for 1½ hours at 20–30° C. to form the cyclic 2,3-dichloro-anthraquinone-1,4-disulphonimide and, after diluting the solution with 85% sulphuric acid to a content of 14% $SO_3$, nitrating this compound by the addition of 112 parts of 98% nitric acid at 0–5° C. After diluting the reaction mixture with water to a content of 75% sulphuric acid, the product which is precipitated in the form of ruby-red prismatic columns is filtered off with suction and after washing with 75% sulphuric acid, washing with ice-water and drying, 284 parts of cyclic 2,3-dichloro-5-nitro-anthraquinone-1,4-disulphonimide are obtained.

EXAMPLE 4

A mixture of 340 parts of 65% oleum and 215 parts sulphuric acid monohydrate is treated at 15–20° C. with 25 parts of sulphur flowers, stirred at 15–20° C. for 30 minutes and diluted with 835 parts sulphuric acid monohydrate. 168 parts of a mixture of 2- and 3-bromo-5-nitro-anthraquinone-1,4-disulphonamide are then introduced at 15–20° C., the reaction mixture is stirred at 25–28° C. for 2 hours, heated to 60° C. within 2 hours and then to 90° C. within 1 hour. The mixture is then treated with 335 parts of 85% sulphuric acid, heated to 115–118° C. and, after 5 minutes at 115–118° C., allowed to cool. It is subsequently diluted with 300 parts of water, filtered off with suction from the excess sulphur and the solution is introduced into 1800 parts of ice. After suction-filtration, boiling with water, another suction-filtration, washing with water and drying, 108 g. of a dyestuff mixture of 2- and 3-bromo-1,4,5-triamino-8-hydroxy-anthraquinone (91.5% of theory) are obtained in the form of an amorphous blue powder.

$C_{14}H_{10}BrN_3O_3$ (348.1): Calc.: Br, 22.95; N, 12.07; O, 13.78. Found: Br, 22.8; N, 11.83; O, 13.52.

When applied to polyethylene terephthalate fibres by dyeing or printing according to the processes of Example 1(b), 1(c), 1(d) or 1(e), the dyestuff yields clear blue shades which are characterised by a high dyestuff yield and very good texture as well as by very good fastness to light, thermofixing, sublimation, rubbing and washing. Blue shades of outstanding fastness properties are obtained on fibres of polyamide, cellulose 2½-acetate or cellulose triacetate according to the processes of Example 1(f), 1(g) or 1(h).

The mixture of cyclic 2- and 3-bromo-5-nitro-anthraquinone-1,4-disulphonamide used as starting material can be prepared, for example, as follows: 130 parts of cyclic 5-nitro-anthraquinone-1,4-disulphonimide are added at 20° C. to 1100 parts of a 36% solution of hydrogen bromide in glacial acetic acid, the mixture is stirred at 20–25° C. for 8 hours, diluted with 750 parts of water at 0–5° C., filtered off with suction, washed with water and dried. 135 parts of a mixture of 2- and 3-bromo-5-nitro-anthraquinone-1,4-disulphonamide are are obtained in the form of pale yellow prisms (86.5% of theory).

The same final product is obtained by using as starting material for the reaction with sulphur in oleum, instead of a mixture of cyclic 2- and 3-bromo-5-nitro-anthraquinone-1,4-disulphonamide, equivalent amounts of the corresponding 1,4-disulphonimide.

EXAMPLE 5

According to Example 4 there is obtained from a mixture of cyclic 2- and 3 - chloro - 5 - nitro-anthraquinone-1,4-disulphonamide or -1,4-disulphonimide, a dyestuff mixture consisting of 2- and 3 - chloro - 1,4,5-triamino-8-hydroxy-anthraquinone; when applied to fibres of polyethylene terephthalate, polyamide, cellulose 2½-acetate and cellulose triacetate by dyeing or printing according to the processes of Example 1(b) to (h), this yields blue shades which are characterised by outstanding fastness properties.

$C_{14}H_{10}ClN_3O_3$ (303.7): Calc.: Cl, 11.68; N, 13.84; O, 15.77. Found: Cl, 12.02; N, 13.47; O, 15.94.

The mixture of cyclic 2- and 3-chloro-5-nitro-anthraquinone-1,4-disulphonamide used as starting material can be obtained, for example, by suspending 30 parts of cyclic 5 - nitro - anthraquinone - 1,4-disulphonimide in 350 parts glacial acetic acid, saturating the solution with hydrogen chloride and introducing hydrogen chloride for 90 minutes while heating to 60° C., until the addition is completed. The reaction mixture is allowed to cool slowly while stirring, filtered off with suction, washed with ice-water and there are obtained 23 parts of a mixture of cyclic 2- and 3 - chloro - 5 - nitro - anthraquinone-1,4-disulphonamide which crystallises in the form of pale yellow square prisms. The mixture of 2- and 3-chloro-5-nitro-anthraquinone - 1,4-disulphonamide can also be obtained by carrying out the addition of hydrogen chloride at 0–10° C. in methanolic hydrochloric acid.

The mixture of cyclic 2- and 3 - chloro - 5 - nitro-anthraquinone-1,4-disulphonamide also used as starting material can be obtained, for example, by oxidising cyclic 2- 3 - chloro - 5-nitro-anthraquinone-1,4-disulphonamide in glacial acetic acid with 30% hydrogen peroxide or with the theoretical amount of chromate.

EXAMPLE 6

A mixture of 238 parts of 65% oleum and 150 parts sulphuric acid monohydrate is treated at 15–20° C. with 17.5 parts of sulphur flowers, stirred at 15–20° C. for 30 minutes and then diluted with 585 parts sulphuric acid monohydrate. 119 parts of cyclic 2 - bromo - 5 - nitro-anthraquinone - 1,4-disulphonimide are then introduced at 15–20° C., the mixture is stirred at 15–28° C. for 2 hours, heated to 60° C. within 2 hours and then to 90° C. within 1 hour. It is then treated with 235 parts of 85% sulphuric acid, heated to 115–120° C. and after 8 minutes at 115–120° C., allowed to cool. At 5–15° C. the mixture is diluted with 350 parts of water, filtered off with suction from the excess sulphur and the solution is slowly diluted with 750 parts of water until the reaction product is precipitated in the form of orange-red small crystals. The product is filtered off with suction, boiled with water and, after suction-filtration, washing with water and drying, there are obtained 75 parts 2 - bromo-1, 4,5 - triamino - 8 - hydroxy-anthraquinone (88.2% of theory), crystallised in the form of dark-blue prisms.

$C_{14}H_{10}BrN_3O_3$ (348.1): Calc.: Br, 22.95; N, 12.07; O, 13.78. Found: Br, 22.65; N, 11.73; O, 13.98.

By dyeing or printing fibres of polyethylene terephthalate, polyamide, cellulose 2½-acetate and cellulose triacetate according to the processes of Example 1(b) to (h), clear blue shades are obtained which are characterised by their good texture and high dyestuff yield as well as by very good fastness to light and wet processing. The dyeings on fibres of polyethylene terephthalate and cellulose triacetate are moreover characterised by outstanding fastness of thermofixing and sublimation.

The cyclic 2 - bromo - 5 - nitro-anthraquinone-1,4-disulphonimide used as starting material can be obtained, for example, by reacting 2 - bromo - 5-nitro-1,4-diaminoanthraquinone with oleum at 15–20° C. It is also possible to use in the above example, instead of the cyclic 1,4-disulphonimide, an equivalent amount of 2 - bromo-5-nitro - 1,4 - diamino - anthraquinone, the cyclic disulphonimide being then formed in situ during the reaction with sulfur in oleum.

EXAMPLE 7

By reacting cyclic 3 - bromo - 5 - nitro-anthraquinone-1,4-disulphonimide according to Example 6 with sulphur in oleum, there is obtained 3 - bromo - 1,4,5-triamino-8-hydroxy-anthraquinone. This dyestuff dyes fibres of polyethylene terephthalate, polyamide, cellulose 2½-acetate and cellulose triacetate in blue shades of very good fastness properties.

EXAMPLE 8

According to Example 6, 2 - chloro - 1,4,5-triamino-8-hydroxy-anthraquinone is obtained from cyclic 2-chloro-5 - nitro - anthraquinone - 1,4-disulphonimide. This dyestuff yields blue dyeings and prints of good fastness properties according to the processes of Example 1(b) to (h).

EXAMPLE 9

According to Example 6, 3 - chloro - 1,4,5- - triamino-8-hydroxy-anthraquinone is obtained from cyclic 3-chloro - 5 - nitro - anthraquinone-1,4-disulphonimide. This dyestuff yields blue dyeings and prints of good fastness properties according to the processes of Examples 1(b) to (h).

What we claimed is:
1. 1,4,5 - triamino - 8 - hydroxy-anthraquinones of the formula

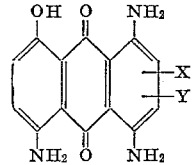

in which X stands for bromine and Y stands for hydrogen or bromine.

2. 2,3 - dibromo - 1,4,5 - triamino-8-hydroxy-anthraquinone.

3. 2 - bromo - 1,4,5 - triamino-8-hydroxy-anthraquinone.

4. 3 - bromo - 1,4,5 - triamino-8-hydroxy-anthraquinone.

References Cited

UNITED STATES PATENTS 3,336,343   8/1967   Ferrari _____ 260—380

LORRAINE A. WEINBERGER, Primary Examiner

H. C. WEGNER, Assistant Examiner

U.S. Cl. X.R.

8—39, 40